United States Patent [19]

Keeler et al.

[11] Patent Number: 4,720,906

[45] Date of Patent: * Jan. 26, 1988

[54] PNEUMATIC INSULATION DISPLACEMENT TERMINAL WIRE INSERTION TOOL

[75] Inventors: Brian G. Keeler, Plainsboro, N.J.; George J. Whitley, Philadelphia, Pa.

[73] Assignee: RCA Corporation, Princeton, N.J.

[*] Notice: The portion of the term of this patent subsequent to Oct. 21, 2003 has been disclaimed.

[21] Appl. No.: 779,099

[22] Filed: Sep. 23, 1985

[51] Int. Cl.⁴ ............................................. B23P 19/02
[52] U.S. Cl. ................................ 29/566.1; 29/33 M; 29/749
[58] Field of Search .............. 29/33 M, 739, 747, 748, 29/749, 750, 850, 863, 866, 884, 566.2, 566.3, 566.4, 564.6, 566.1, 564.8

[56] References Cited

U.S. PATENT DOCUMENTS

| | | | |
|---|---|---|---|
| 3,460,238 | 8/1969 | Christy et al. | 29/481 |
| 3,734,386 | 5/1973 | Hazel | 228/5 |
| 3,866,294 | 2/1975 | McCaughey | 29/203 |
| 3,935,628 | 2/1976 | Tucci | 29/749 |
| 3,997,955 | 12/1976 | McCaughey | 29/566.4 |
| 4,118,103 | 10/1978 | Leidy et al. | 339/98 |
| 4,194,281 | 3/1980 | Gudmestad | 29/867 |
| 4,210,997 | 7/1980 | Holt | 29/749 X |
| 4,216,580 | 8/1980 | Chisholm | 29/842 |
| 4,271,573 | 6/1981 | von Roesgen | 29/33 |
| 4,272,879 | 6/1981 | Wigby et al. | 29/566.2 |
| 4,307,504 | 12/1981 | Davis et al. | 29/566.3 |
| 4,387,509 | 6/1983 | Dechelette | 29/850 |
| 4,399,842 | 8/1983 | Gibbons | 140/92.1 |
| 4,414,740 | 11/1983 | Nijman | 29/751 |
| 4,437,603 | 3/1984 | Kobayashi et al. | 228/4.5 |
| 4,461,061 | 7/1984 | Rock | 29/33 |
| 4,551,901 | 11/1985 | Bonifanti et al. | 29/564.6 |
| 4,617,731 | 10/1986 | Carrell et al. | 29/861 |

FOREIGN PATENT DOCUMENTS 705713 12/1979 U.S.S.R. .

OTHER PUBLICATIONS

Operator's Manual for Thermosonic Ball Bonding Mahine, Section 3, 1412/1413 Operation, Kulicke Soffa, Horsham, PA.
Standard Products Catalog/3, Third Edition, Catalog 2005-8, issued Aug. 1983, by AMP, Inc., pp. 46, 89-93, 228, 231, 280-285, 397, 440, and 479.
AMP Pneumatic Insertion Tool 58069-1, Instruction Sheet IS 6799, released Jul. 13, 1985, by AMP Inc., pp. 1-4.
"Availability, Operation, and Size Ranges for Automatic Discrete Wire Harness Mass Termination I.D. Connector Systems," reprinted from Insulation/Circuits, Jun. 1979, pp. 1-5.

Primary Examiner—Gil Weidenfeld
Assistant Examiner—Glenn L. Webb
Attorney, Agent, or Firm—Allen L. Limberg; William Squire

[57] ABSTRACT

A pair of fingers are operated by air cylinders at different rates in accordance with a given wiring function. In one function, one finger engages, supports and aligns an IDT at low pressure prior to insertion of the wire by the other finger at high pressure. The opening and closing of the fingers is also at high pressure. The closing of the fingers captivates the wire in alignment therewith as the tool travels from terminal to terminal. The wire is severed from the last terminal in the wiring sequence by an air operated knife. The tool is adapted to be connected to a robotic arm.

16 Claims, 8 Drawing Figures

PNEUMATIC INSULATION DISPLACEMENT TERMINAL WIRE INSERTION TOOL

This invention relates to tools for attaching a length of wire to an insulation displacement terminal.

Of interest are the following copending applications: Ser. No. 779,100, filed concurrently herewith, entitled "Insulation Displacement Terminal Wire Insertion Tool and Method," by Ross M. Carrell et al., now U.S. Pat. No. 4,617,731 Ser. No. 751,900, filed July 5, 1985, entitled "Wire Insertion Apparatus for Insulation Displacement Terminal," by John G. Aceti et al.; and Ser. No. 738,394, U.S. Pat. No. 4,648,676 filed May 28, 1985, entitled "Terminal and Method of Using Same," by Ross M. Carrell, all of which are assigned to the assignee of the present invention.

Terminals for receiving insulated wires directly which do not require that the insulation first be removed and which automatically cut into the insulation and deform the wire to make a reliable electrical connection, are in wide use and are known as insulation displacement terminals (IDTs). Such a terminal includes at least one bifurcated element forming a pair of spaced tines. The spacing between the tines is smaller than the diameter of the conductor of the insulated wire to be connected to the terminal. When an insulated conductor is pushed into the space between the tines, the insulation is cut by the tines so that each tine makes electrical contact with the conductor. The insertion of the wire scrapes away any contamination on the surfaces of the conductor and the tines, deforming the conductor and bringing fresh metal surfaces of the conductor and the tines together in compression.

One example of the use of such terminals is illustrated in U.S. Pat. No. 4,387,509. A particular terminal which might be useful in the above-mentioned patent is disclosed in U.S. Pat. No. 4,118,103. Another IDT which would be useful in the embodiment of the aforementioned U.S. Pat. No. 4,387,509 is a terminal known as "Quadra-mate" manufactured by AMP, Inc., shown in their Standard Products Catalog/3, Third Edition, Catalog 2005-8, issued Aug. 1983, page 479. There are automatic apparatuses for pushing wires onto IDTs such as shown in U.S. Pat. Nos. 4,461,061 and 4,271,573 and in copending application Ser. No. 751,900 and the application filed concurrently herewith, mentioned above.

As disclosed in application Ser. No. 738,394 mentioned above, a problem with IDTs as presently commercially employed and illustrated by way of example in the aforementioned patents, is that the corresponding insertion tool usually applies a force of relatively large magnitude, for example, about 20 lbs. with 24 AWG wire, to push the wire into the IDT slot. In a case where the substrate to which the IDT is secured is a thin member such as a printed circuit board and so forth, support is required for the substrate to withstand that insertion force. Additionally, when a large number of IDTs or components are employed on a substrate, the substrate tends to have a large number of apertures. These apertures tend to weaken the substrate so as to make support of the substrate during insertion of the wire into the IDTs extremely important. Without such support, the substrate may tend to fracture or otherwise undesirably deform, precluding proper insertion of a wire into the IDT.

Aforementioned copending application Ser. No. 738,394 discloses a terminal which deals with the above-noted problem with present commercially available IDTs. This terminal is illustrated in FIG. 5 herein. In this terminal the wire is pushed onto the tines in a direction parallel to the substrate supporting the IDT and permits the relatively high insertion force to be applied in pliar-like fashion to avoid applying a direct force on the substrate during the insertion. Disclosed in the application filed concurrently herewith are a pair of cam-operated insertion fingers for squeezing the wire onto the IDT. The cam is operated by a servo motor. The power from such a motor is limited and the use of larger motors for relatively heavy gauge wire, e.g., 24 AWG or greater, can become unwieldy as an end effector for a robotic arm where weight can be critical. For this reason, the present inventors recognize that pneumatic and hydraulic operated systems can provide such additional power in a relatively small space with low weight. The problem is, however, pneumatic systems (intended to be generic herein to hydraulic systems) tend to have two discrete cylinder positions, one at each end of the cylinder stroke. As disclosed in the aforementioned application filed concurrently herewith, the fingers have different states requiring different actions. Such different actions are not easily adapted by pneumatic systems.

A wire insertion tool according to the present invention comprises a support adapted to be attached to an automatic insertion tool head which locates and moves the tool relative to an IDT on a substrate. The tool includes a first element having an open state and a terminal support state movably secured to the support. The element includes a portion which has a groove therein adapted to receive, mate with, and abut a tine support structure of an IDT terminal when the element is in the support state. The groove and the terminal support structure are dimensioned such that the receiving of the terminal support structure in the groove tends to align the tines of the terminal relative to the groove.

A second element has an open state and a wire insertion state movably secured to the support spaced from the first finger. The second element includes a wire insertion member adapted to mate with the terminal tines for pushing the wire into electrical engagement with the aligned tines when the second element is in the insertion state. Wire feed means are secured to the support for feeding the wire between and aligned with the groove and the insertion member.

Pneumatic actuating means are coupled to the support and elements for initially pneumatically moving the first element from its open state to its support state at a first rate sufficiently low to seat and align the tine support structure in the groove and thereby align the tines relative to the second element. The actuating means then pneumatically moves the second element in the insertion state at a second rate significantly greater than the first rate to push the wire into engagement with the tines toward the first element. The first element supports the tines at the tine support structure during the wire pushing.

In the drawings:

FIG. 2 is a rear elevation view, partially in section, of a portion of the tool of FIG. 1a;

FIG. 4 is an exploded view of a portion of the fingers of the tool of FIG. 1a;

FIG. 5 is an isometric view of a terminal with the wire attached by the tool of FIG. 1a;

Figure 1A:
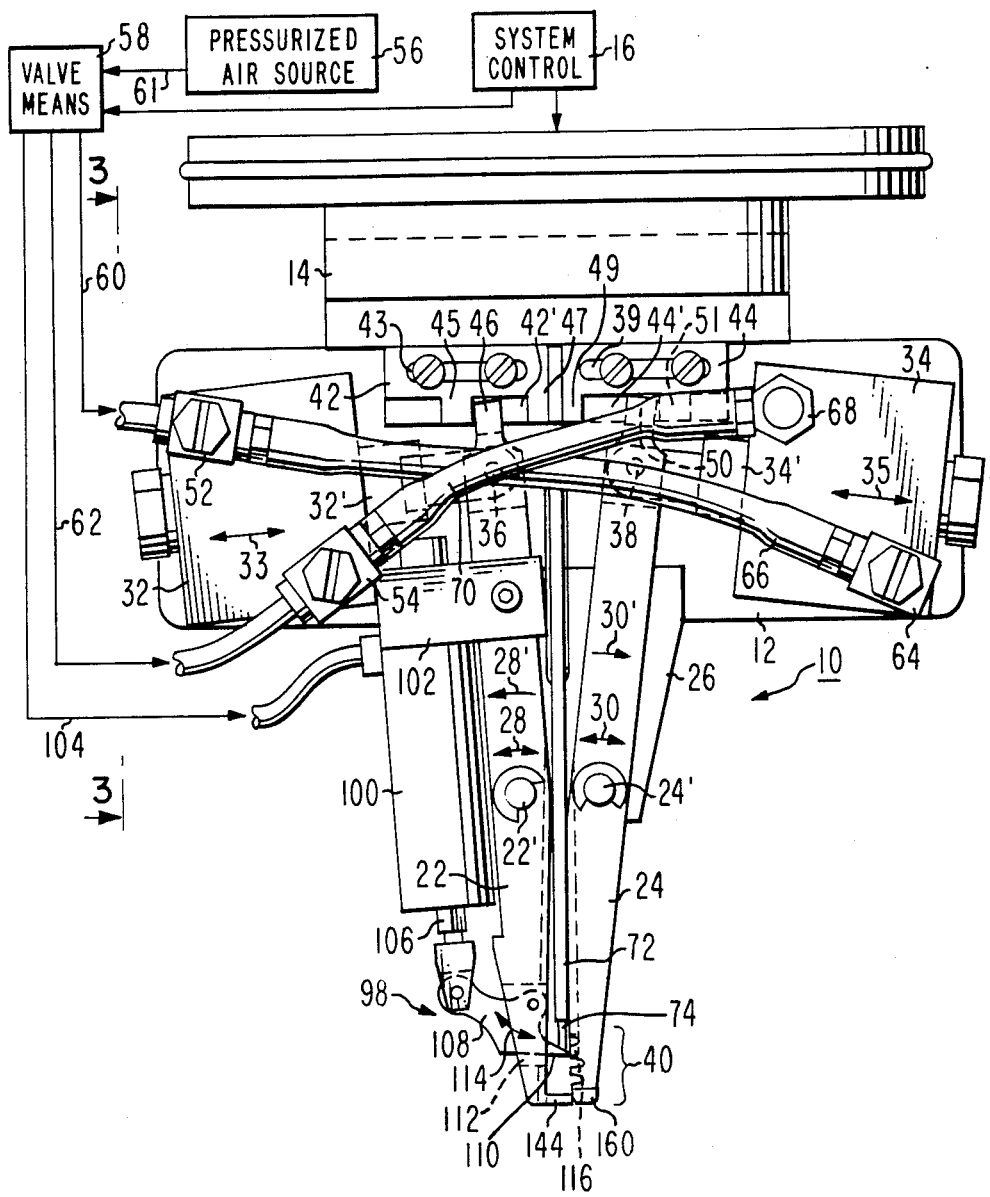
FIG. 1a is a front elevation view, partially schematic, of a tool in accordance with one embodiment of the present invention.

In FIG. 1a, tool 10 comprises a support 12 secured to head 14 which is adapted to be attached to a robotic arm under control of system control 16. System control 16 may be, for example, a computer programmed automatic robotic system which can be programmed to move the arm of the robot (not shown) and thus head 14 to any desired set of three-dimensional coordinates in any orientation. Control 16 is commercially available and can be programmed by one of ordinary skill in the art to perform the functions as described herein below. Control 16 can move head 14 in any linear or angular direction relative to a given substrate 18, for example, a printed circuit board and insulation displacement terminal (IDT) 20 attached to the substrate, FIG. 1b. Substrate 18 can be oriented in any plane and in any direction.

While only one IDT 20 is illustrated in FIG. 1, in practice, at least two or more IDTs are secured to the substrate to which a single wire may be attached by the tool 10. Further, there may be a greater number of IDTs on the substrate 18. The tool 10 can sequentially attach a length of wire to a number of those IDTs, sever that length of wire from the wire at the tool and then attach a second length wire to another group of the IDTs. The wiring is completed in any sequence regardless of the IDT's plane and orientation relative to the tool 10.

Fingers 22 and 24 are pivotally secured to support 12 via respective pivot pins 22' and 24'. Pins 22' and 24' are attached to leg 26 depending from support 12. Fingers 22 and 24 are driven about the respective pivot pins 22' and 24' in corresponding directions 28 and 30 by a pneumatic system including respective air cylinders 32 and 34 secured to support 12. Although the term "pneumatic" is used throughout the present specification and claims, it is intended to cover both compressed air and hydraulic systems.

Air cylinder 32 comprises a shaft 32' which can move back and forth in directions 33. Air cylinder 34 comprises a shaft 34' which can move back and forth in directions 35. Shaft 32' is pinned to an end of finger 22 by pin 36 and shaft 34' is pinned to an end of finger 24 by pin 38. The extended lower ends of the fingers, region 40, performs the wire insertion function and will be described later.

Secured to support 12 are stops 42 and 44. Stop 42 includes a slot 43 and members 45 and 47 which define space 42'. Space 42' limits the rotation of upper end 46 of finger 22 setting the open and closed positions of the lower end of finger 22. Slot 43 permits adjustment of the position of stop 42 and thus the relative end points of the motions of finger 22. Similarly, stop 44 includes a slot 39 and members 49 and 51 which define space 44'. Space 44' limits the rotation of upper end 50 of finger 24 setting the open and closed positions of the lower end of finger 24. Slot 39 is similar to slot 43 and permits adjustment of stop 44. In FIG. 1a, the fingers are shown fully closed, referred to herein as the wire captivate state. When the fingers are rotated in directions 28 and 30 to move their upper ends 46 and 50 toward one another, the lower ends in region 40 are placed in their open state.

Air cylinder 32 has two air inlet fittings 52 and 54 and cylinder 34 has two air inlet fittings 64 and 68. Hose 66 couples fittings 52 and 64 and hose 70 couples fittings 54 and 68. Line 61 couples pressurized air source 56, which may be at a line pressure of 60 psi, for example, to valve means 58. Means 58 comprises a bank of solenoid operated valves (not shown) for coupling source 56 to fitting 52 via line 60 and to fitting 54 via line 62. The valves are also coupled to vent a selected one of fittings 52 and 54 to the ambient atmosphere when the other fitting receives pressurized air. The solenoids of valve means 58 are operated by control 16 which selectively opens and closes the desired valves in accordance with a given sequence, as will be described in more detail below. Valve means 58 also includes a pressure regulator for reducing the air pressure supplied to fitting 54 during certain predetermined time intervals, as will also be explained more fully below.

Fittings 52 and 64 are positioned so that applied pressurized air extends the respective shafts 32' and 34' in a direction to open the fingers at region 40 to a position as determined by stops 42 and 44. Fittings 54 and 68 at this time are vented by valve means 58. Conversely, fittings 54 and 68 are positioned so that applied pressurized air retracts shafts 32' and 34', closing the fingers in region 40 to the position as determined by stops 42 and 44. At this time fittings 52 and 64 are vented.

Fitting 68 includes an adjustable orifice for reducing the flow rate of the pressurized fluid (e.g., air) on hose 70 into cylinder 34. Fittings 52, 54, and 64 transfer the applied inlet air pressure to the respective air cylinders. Because fitting 68 reduces the flow rate of pressurized air from source 56 applied to the cylinder 34 piston, the cylinder 32 piston moves more quickly when hose 72 receives pressurized air from source 56. Thus, finger 22 tends to rotate in direction 28' from the open position to the closed position illustrated in FIG. 1b more quickly than finger 24's rotation in direction 30' to the wire captivate state illustrated in FIG. 1a. The importance of these differences in finger closing rates will be discussed below.

Figure 2:
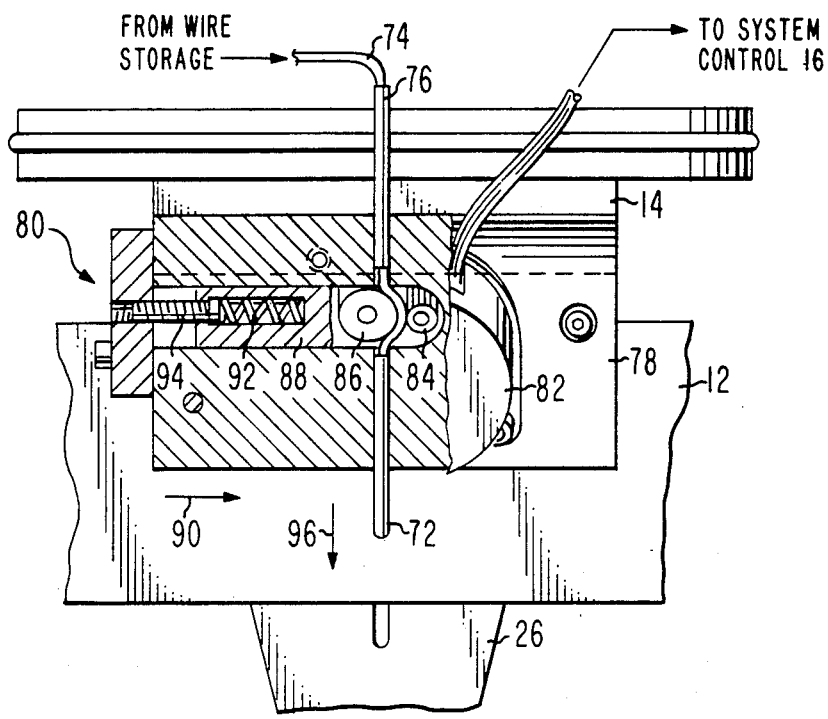
Figure 3:
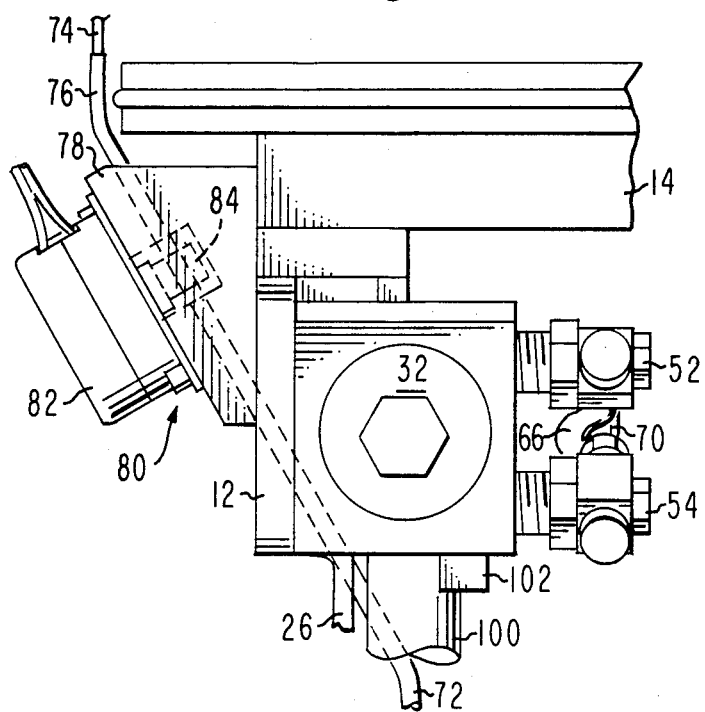
FIG. 3 is a side elevation view of a portion of the tool of FIG. 1a taken along lines 3—3.

In FIG. 1a, a wire feed tube 72 is secured to support 12 and depends midway between the fingers 22 and 24 to region 40 for guiding insulated metal core wire 74 to the space between the fingers at region 40. In FIG. 2, wire 74 is fed to tube 72 through a second tube 76 secured to housing 78 attached to support 12. Tube 76 is aligned with tube 72 to pass wire 74 into wire feed assembly 80 located between the tubes. A magazine or spool of wire (not shown) supplies wire 74 to tube 76. The spool may be attached to the tool 10 or may be situated at a remote location.

Feed assembly 80, FIG. 2, includes a drive motor 82, which may be a servo motor, having a toothed feed wheel 84 which abuts spring-loaded idle wheel 86. Wheel 86 is attached to a plunger 88 which is resiliently urged in direction 90 by compression spring 92. The magnitude of the force of spring 92 in direction 90 is set by screw 94. Wire 74 passes between wheels 84 and 86 as it follows the path from tube 76 to tube 72 in feed direction 96. Motor 82 is controlled by a signal from the system control 16, FIG. 1a. Wire is fed by feed assembly 80 to a position between the fingers at region 40, FIG. 1a, prior to utilization of the tool 10 at the beginning of a wiring cycle. The wire is fed in response to a signal from control 16 to motor 82.

Figure 1B:
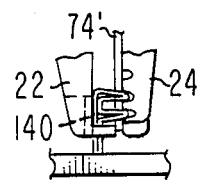
FIG. 1b is a more detailed view of the fingers of the tool of FIG. 1a illustrating the insertion of a wire onto a terminal.

In FIG. 1a, wire cutting assembly 98 includes an air cylinder 100 secured to finger 22 by bracket 102. Air cylinder 100 is single-acting and coupled to air source 56 through valve means 58 and air lines 104 and 61. Air cylinder 100 has a shaft 106 coupled to bell crank blade 108. Blade 108 is pivoted at one end to shaft 106 and at a point spaced therefrom to finger 22 in slot 112 for rotations in directions 114. Blade 108 has a cutting edge 110. When the fingers are closed in the wire captivating state of FIG. 1a, pressurized air selectively applied on line 104 by control 16 extends the shaft 106 of cylinder 100 as shown. This action moves the blade 108 about its pivot in one of directions 114 toward finger 24 to the position shown in FIG. 1a, causing cutting edge 110 to abut anvil 116, which may be a nylon insert, of finger 24, severing wire 74 between the fingers in region 40. Once the wire 74 is so cut, the feed assembly 80, FIG. 2, is then caused by system control 16 to feed wire 74 so that a portion 74', FIG. 1b, is in region 40 between the fingers. Control 16 causes valve means 58 to supply a short-duration, high-pressure pulse to cylinder 100 to so operate blade 108. The cylinder 100 includes a spring operated piston for returning the blade to its quiescent position, FIG. 4, when the pressure pulse terminates.

Figure 5:
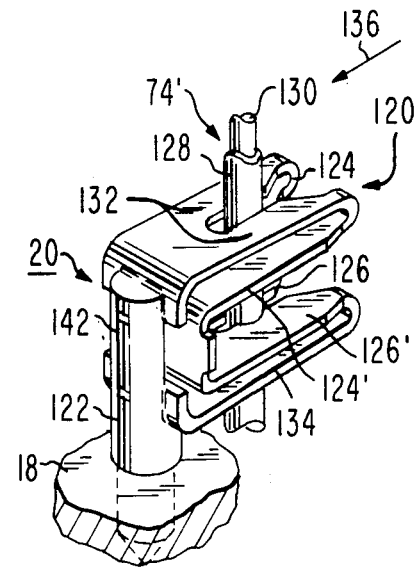

In FIG. 5, a typical IDT 20 includes a set of tines 120 attached to a post 122 at rib 142. Post 122 is attached vertically to a substrate 18 so that the tines 120 are parallel to the substrate. Tines 120 may be a portion of the Quadra-mate terminal mentioned in the introductory portion above. The tines 120 include a first tine set 124, 124' and a second set 126, 126'. Tine sets 124, 124' and 126, 126' penetrate the insulation 128 and make electrical contact to the inner metal conductor 130 of the wire portion 74' as the wire is pushed onto the terminal. The upper tine set 132 and the lower set 134 grasp the insulation 128. Insertion of the wire portion 74' onto the terminal 20 requires the wire to be oriented with its length dimension perpendicular to the substrate 18 and pushed onto the tines in direction 136 parallel to the plane of the substrate. The fingers 22 and 24, FIG. 1a, in region 40 cooperate to push the wire onto the terminal.

Figure 4:
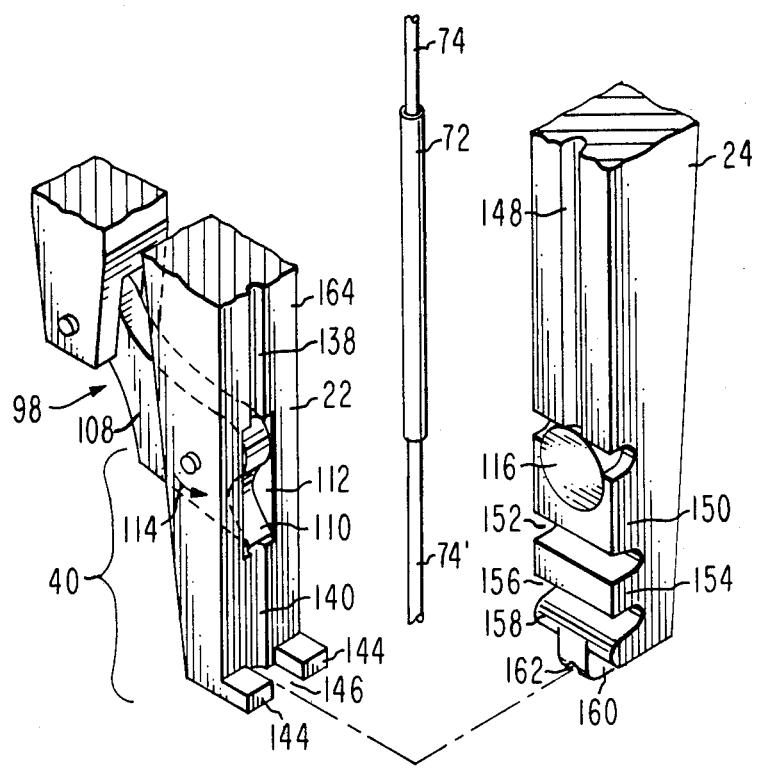

FIG. 4 shows the lower ends of the fingers 22 and 24. Finger 22 includes an elongated clearance groove 138 which receives tube 72 when the fingers are closed. Slot 112 and blade 108 mentioned previously are shown more clearly in FIG. 4. The lower end of finger 22 includes a groove 140 which is dimensioned to closely receive and abut terminal post 122 at tine support rib 142, FIG. 5. A pair of projections 144, FIG. 4, extend from the lower end of finger 22 toward finger 24, forming a wire receiving channel 146. The wire portion 74' fed from tube 72 passes through channel 146.

Figure 6:
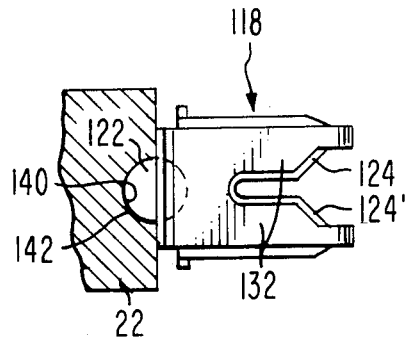
FIG. 6 is a plan view of a terminal similar to the terminal of FIG. 5 illustrating one of the fingers of tool FIG. 1a supporting the terminal prior to insertion of the wire by the other finger.

In FIG. 6, groove 140 of finger 22 is mated with rib 142, finger 22 being in the terminal support state. In this state, finger 22 is positioned as shown in FIG. 1b. Groove 140 is nested with the rib 142, the slot 112 and blade 108 being in a region above the terminal, FIGS. 1a, 4, and 1b. The stiffness of post 122 and rib 142, and the support of the post by the adjacent substrate 18, produces reaction forces on groove 140 during the wire insertion. Rib 142 provides support for those reaction forces which oppose those forces induced by the insertion of the wire. Stop member 45, FIG. 1a, is adjustably positioned to permit groove 140 to be so nested. Slot 43 of stop 42 allows such an adjustment. The nesting of the terminal and finger aligns the rib 142 abutting groove 140 to the desired orientation. This alignment may involve small motions of mutual accommodation (shift of position) by terminal 20, support 12 and the supporting robot (not shown). It is well known that small compliant accommodations of alignment errors are necessary in robotic assembly operations. In many cases, the compliance is provided by the robot structure because the joint positioning servos do not provide complete rigidity when the robot arm is stationary.

As shown in FIG. 4, finger 24 includes a tube clearance groove 148 which receives tube 72 when the fingers are closed. Anvil 116 cooperates with cutting edge 110 of blade 108 for severing wire portion 74'. Pedestal 150 adjacent notch 152 serves to push wire portion 74' onto terminal 20, FIG. 5, in the region above tines 132. Wire pushing pedestal 154 between notches 152 and 156 pushes wire portion 74', FIG. 5, in a region between tine pairs 124, 124' and 126, 126'. The notches 152 and 156 receive the extended ends of the terminal 20 tines. Lower pedestal 158 is separated from pedestal 154 by notch 156 and pushes wire portions 74' in a region below lower tines 134, FIG. 5. Extending below pedestal 158, FIG. 4, is a projection 160 which has a wire receiving groove 162 along its lower surface. Projection 160 is sufficiently narrow to fit within the channel 146 between projections 144 of finger 22 when the fingers are closed. When the fingers 22 and 24 are closed, the projection 160 remains spaced from the plane of the wall 164, finger 22, to form an enclosed aperture with channel 146 which embraces wire portion 74' passing therethrough to thus captivate the wire.

As mentioned in the introductory portion above, when pushing a relatively heavy gauge wire, for example, 24 AWG, onto an IDT terminal 20, a pushing force of 20 lbs. or greater may be required. Such a force may tend to bend the post 122 unless the post is otherwise supported. For this reason, finger 22, groove 140, FIG. 6 (only one finger being shown), is aligned with and seats with the post portion 142 prior to the insertion of wire 74' by finger 24, FIG. 1b. To do this, the fingers are initially opened and aligned above a given terminal. System control 16, FIG. 1a, causes valve means 58 to apply high pressure air on line 60 to fittings 52 and 64, FIG. 1a, to extend shafts 32' and 34' of the respective air cylinders, thereby opening the fingers. In the interim, system control 16 has operated the robotic system to place head 14 at the desired coordinates above the substrate, for example, substrate 18, FIG. 1b, aligned with a given terminal.

The fingers are then lowered to embrace the terminal and control 16 then operates valve means 58 to apply a low pressure regulated air on line 62 to fittings 54 and 68. The reduced air pressure may be, for example, at 1–2 psi to enable the finger 22 to slowly rotate and engage the terminal on the substrate. The groove 140, FIG. 4, slowly seats itself on the terminal rib 142, FIG. 5, and aligns the terminal therewith. This slow action aligns a terminal which may be slightly out of alignment prior to engagement with finger 22. This gradual alignment is important as too quick an action may not allow the masses of the tool and robot to move in compliant response to misalignment and may therefore bend or destroy the terminal.

Because the reduced orifice at fitting 68 provides a reduced flow rate to the piston of cylinder 34, FIG. 1a, its piston moves more slowly and finger 24 does not yet insert wire portion 74' onto the terminal. For this reason, it is important to set the orifice of fitting 68 accordingly. This orifice adjustment can be done empirically. In this way, both air cylinders 32 and 34 can be operated by a single line 60 or 62 when the fingers are being closed and opened, respectively.

After finger 22 fully engages and seats on a terminal, FIG. 1b, control 16 is timed to then cause valve means 58 to apply a high pressure air pulse on line 62 to fittings 54 and 68, causing the finger 24 to rapidly close at high pressure upon the terminal, e.g., terminal 20, FIG. 1b, which is supported at this time by finger 22. This rapid closure inserts the wire portion 74' onto the terminal tines. The finger 24 cannot fully close to the wire captivate state because of the presence of the terminal between the fingers, i.e., finger 24 does not abut stop member 51 at this time. During the insertion, however, finger 22 supports the terminal 20 and keeps it in the desired alignment. Should the finger 24, FIG. 1a, be permitted to fully close until upper end 50 abuts the stop 44 member 51, the fingers 22 and 24 will be more closely together than as illustrated in FIG. 1b, e.g., as shown in FIG. 1a.

Figure 7:
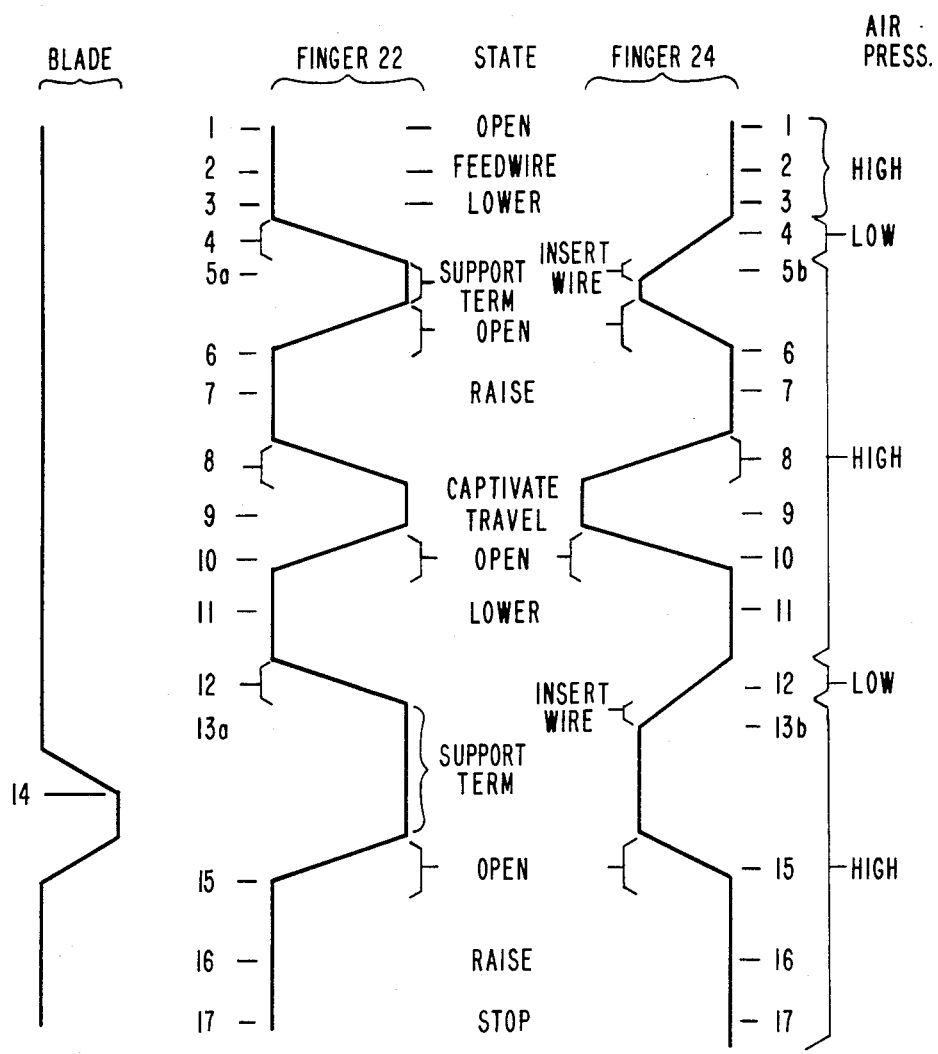
FIG. 7 is a graph illustrating one sequence for operating the tool of the present invention.

FIG. 7 graphically illustrates the above wiring sequence and a more complex wiring sequence for wiring two terminals. The 17 steps of the wiring process enumerated in FIG. 7 are listed vertically with the movement of the fingers 22 and 24 with respect to each other being shown by the various solid lines. The steps described above correspond to steps 1-4, 5a, and 5b. It can be seen in step 5a that the terminal support motion of finger 22 begins prior to the insertion of the wire at step 5b by finger 24. The lower air pressure is applied in step 4 for operating both fingers simultaneously. It should be understood that the lowering, raising and alignment of the fingers to a given terminal is due to displacement of the robot arm (not shown) under the control of system control 16. The opening and closing of the fingers is by the pneumatic system comprising air cylinders 32 and 34 and valve means 58 and air source 56, FIG. 1a, also under the control of control 16.

In FIG. 7, upon insertion of the wire onto the terminal at high pressure, step 5b, pressure is removed from line 62 and is applied to line 60, FIG. 1a, extending the shafts of the respective air cylinders, opening the fingers, step 6. Once the fingers are open, the fingers are raised, step 7, and after the fingers clear the terminal, they are closed to captivate the wire passing through the channel 146, FIG. 4. Once the wire is captivated it is fed through the fingers as they are moved by the robotic system in step 9 to a second terminal. When the fingers reach the second terminal, the fingers are opened, step 10, under high pressure. In step 11, the fingers are lowered until they embrace the desired terminal. In step 12, low pressure is applied to the fingers to close the fingers and cause the finger 22 to support that terminal prior to insertion of the wire. The wire is then inserted by finger 24 with a high pressure pulse applied to both fingers, step 13b, and assuming that this terminal is the last terminal in the wiring cycle, blade 108 is operated by a high pressure pulse applied to cylinder 100, FIG. 1a, step 14. This severs the wire at the terminal from the wire in the tool 10. Once the wire is severed, step 15, the fingers are opened and raised, step 16, and the cycle stopped, step 17.

The sequence of steps may be repeated any number of times on a given substrate or different substrates. In addition, steps 1-13b, may be repeated for any number of terminals without severing the wire at step 14. In that case, step 13b would be followed by a cycle of steps, including the open finger step 6 and so forth, continuing to wire a single strand of wire to any number of terminals until that wiring sequence is completed. Further, the terminals may not necessarily be in the same plane but can be located in many different orientations for wiring by the system 16, FIG. 1a.

The insertion portion of the cycle comprises a relatively high-pressure, short-duration pulse which appears to occur instantaneously. The relatively high force assures proper seating and insertion of the wire onto the tines. In the embodiment illustrated, the fingers 22 and 24 are pivotally secured to support 12. In the alternative, the fingers may comprise elements movably secured to the support in other ways, e.g., secured for reciprocating rather than rotation. The important factor is that reaction forces are minimized on the robot and substrate and relatively few pressure lines can pneumatically operate the insertion fingers in multiple states and rates.

The feeding of the wire to tool 10 may be positive as disclosed in the copending application filed concurrently herewith. In that system a servo system, e.g., motor 82, FIG. 2 herein, coupled to the feed system feeds the wire to the tool as the tool moves from a terminal. The feed is under control of a computer program in the system control. This system of positive feed tends to minimize tension in the wire and curl in the wire. In the alternative, the feed may be passive. The feed drive motor 82, FIG. 2, is of low inertia and freely rotates when not energized. Therefore, the motor does not contribute significantly to pulling tension in the wire after it has been attached to an IDT but not yet severed from the tool.

What is claimed is:

1. A pneumatic wire insertion tool for inserting a wire into electrical engagement with an insulation displacement terminal (IDT) on a substrate, said terminal including a set of spaced tines extending in a given direction for receiving said wire at one end thereof and further including tine support structure at the other end thereof for securing said tines to a post extending approximately normal to said direction, said tool comprising:

a support adapted to be attached to an automatic insertion tool head which locates and moves the tool relative to said IDT;

a first element movably secured to the support having an open state and a terminal support state, said element including a portion having a groove therein adapted for receiving and mating with said tine support structure in said support state, said groove and support structure being dimensioned such that said receiving groove tends to align said tines relative to said groove;

a second element having an open state and a wire insertion state movably secured to the support spaced from the first element, said second element including a wire insertion member adapted to mate with said tines in said insertion state for pushing said wire into said electrical engagement with said aligned tines;

wire feed means secured to the support for feeding said wire between and aligned with said groove and said insertion member; and pneumatic actuating means coupled to the support and elements for initially pneumatically moving said first element from its open state to its support state at a first rate sufficiently low to seat and align said tine support structure in said groove and thereby align said tines relative to said second element and for then pneumatically moving said second element in said insertion state at a second rate significantly greater than said first rate to push said wire into said engagement toward the first element, said first element supporting said tines at said tine support structure during said wire pushing.

2. The tool of claim 1 wherein said actuating means includes a first pneumatic means for placing and maintaining said first element in the support state; and a second pneumatic means for moving the second element into said insertion state after placing the first element in said support state.

3. The tool of claim 1 wherein said actuating means includes first and second pneumatic means responsive to a fluid applied as an input thereto for respectively moving said first and second elements and flow restriction means coupled to the second pneumatic means adapted to reduce the flow of said applied pressurized fluid to said second pneumatic means an amount sufficient to cause the applied fluid to move the first element into the support state from its open state prior to the commencement of said second element insertion state.

4. The tool of claim 3 wherein said actuating means includes pressure control means coupled to said first and second pneumatic means adapted to reduce the pressure of said applied fluid during the moving of said first element to the support state and for significantly increasing the pressure of the applied fluid after the first element reaches said support state to move the second element in the insertion state.

5. The tool of claim 1 further including a blade movably secured to one of said elements and facing the other element, said other element including a cutting anvil facing and adapted to mate with said blade, said feed means including means for feeding said wire between said blade and anvil, said actuating means including pneumatic means for selectively moving said blade an amount sufficient to sever said wire passing between said blade and anvil.

6. The tool of claim 1 wherein said elements include channel means for embracing said fed wire at a location adjacent to the insertion member and groove in a wire captivating state to retain said fed wire in alignment with said elements after the attachment of said wire to said terminal; and said actuating means including stop means secured to said support and coupled to the elements for stopping the movement of said elements in said open state in one element movement direction and in said wire captivating state in a second element movement direction.

7. The tool of claim 1 wherein said pneumatic means includes pneumatic element drive means coupled to the support for moving each said elements in response to applied pressurized fluid, and control means and valve means responsive to said control means for selectively applying said pressurized fluid as an input to said drive means, said control means including means for selectively causing the valve means to apply said pressurized fluid at a first pressure value to said drive means to move said elements to their respective open states and at a second pressure value to move said first element to its terminal support state, the second value being significantly lower than the first value.

8. The tool of claim 7 wherein the means for selectively applying said fluid includes means responsive to said lower value pressure for moving the second element from its open state to a point just prior to entering its insertion state and for causing the first element to enter the support state prior to the second element entering its insertion state.

9. The tool of claim 8 wherein the drive means includes first and second pneumatic means for respectively driving the first and second elements, said second pneumatic means including fluid flow rate adjust means adapted to receive said applied fluid for reducing the flow rate of said received pressurized fluid relative to the flow rate applied to the first drive means to thereby cause said applied fluid to move the first element more quickly than the second element from their respective open states.

10. The tool of claim 1 including means for pivotally securing the elements to the support, said actuating means including a first fluid cylinder coupled to the support to pivotally drive the first element and a second fluid cylinder coupled to the support to pivotally drive the second element, each said cylinders being coupled to receive pressurized fluid applied as an input thereto from a single source.

11. The tool of claim 1 wherein said actuating means includes control means for selectively applying pressurized fluid from said source at first and second different pressure values, said first value being at a level corresponding to said first rate and the second value being at a level corresponding to said second rate.

12. The tool of claim 11 wherein said actuating means includes flow rate adjust means coupled to the second fluid cylinder to reduce the flow rate of said fluid to said second fluid cylinder to a level below the value of the flow rate to the first fluid cylinder.

13. The tool of claim 11 wherein said second element has a wire captivate state different than its open and insert states, said tool including element stops secured to the support and coupled to the elements for stopping the elements in their open state and in the respective wire support and captivate states in response to the selective operation of said cylinders.

14. In a wire insertion apparatus including a tool for automatically attaching a length of wire to an insulation displacement terminal (IDT) of the type including a pair of insulation displacement tines extending approximately normal to a post attached to a substrate, said apparatus including tool locating and displacement means for automatically locating the wire insertion tool at a given wire insertion location on the substrate for inserting the wire onto said IDT and for moving the tool from terminal to terminal on the substrate, said tool comprising:

first and second aligned facing fingers movably secured to the support in spaced relation, each finger adapted for moving in first and second opposite directions so that said fingers may be positioned in an open state and a wire captivating state, the first finger including terminal support means adapted to abut said terminal for aligning and supporting said tines to create a reaction force in response to a pushing force by the second finger normal to said post, the second finger including wire pushing means adapted to push said wire toward said terminal support means into engagement with said tines in a wire insertion state intermediate said open and captivating states, at least one of said fingers having a channel dimensioned to permit said wire to pass therethrough and shaped to selectively form an enclosed aperture with the other of said fingers in said wire captivating state to retain said passed-through wire in alignment with said terminal support means and pushing means as said tool is moved from terminal to terminal;

a support including a first stop means for locating the first finger in the open state and in the terminal support state in accordance with the direction that the first finger is moved, said support also including a second stop means for locating the second finger in the open state and in the wire captivating state in accordance with the direction that the second finger is moved;

wire feed means secured to the support for selectively feeding wire to said wire pushing means;

wire severing means coupled to said fingers for selectively severing said length of wire from said wire fed by said feed means; and pneumatic actuating means coupled to said support for selectively cooperatively placing said fingers in said open, terminal support, wire insertion, and captivating states.

15. The tool of claim 14 wherein said pneumatic actuating means includes control means, pneumatic finger operating means and valve means, said valve means having an input and an output responsive to said control means for selectively causing pressurized fluid applied as an input thereto to be applied at said output and to said operating means, said operating means for pneumatically actuating said first and second fingers, said valve means applying fluid at a first relatively low pressure to said operating means for initially placing said first finger into the terminal support state and then the second finger into the insertion state and at a second relatively high pressure to then operate the second finger when in the insertion state.

16. The tool of claim 15 wherein said operating means includes first and second fluid cylinder means secured to the support and means adapted for coupling the first and second cylinders to the same source of fluid pressure, the second cylinder means including means for reducing the flow of said fluid at said relatively low pressure to cause said initial placement of said first finger.

* * * * *